United States Patent [19]

Blackie et al.

[11] 3,918,086

[45] Nov. 4, 1975

[54] TAPE ELEMENT, SYSTEM AND METHOD FOR REVERSAL OF TAPE MOVEMENT DURING LOW SOUND LEVELS

[75] Inventors: James W. F. Blackie; Gregory J. Maleski, both of Sunnyvale; Chester W. Newell, San Jose; Charles A. Vogel, Sunnyvale, all of Calif.

[73] Assignee: American Videonetics Corporation, Sunnyvale, Calif.

[22] Filed: Sept. 21, 1971

[21] Appl. No.: 182,562

Related U.S. Application Data

[63] Continuation of Ser. No. 42,278, June 1, 1970, abandoned, which is a continuation-in-part of Ser. No. 648,665, June 26, 1967, Pat. No. 3,573,393.

[52] U.S. Cl. .................... 360/55; 360/74; 360/134

[51] Int. Cl.$^{2}$ .................. G11B 5/027; G11B 15/18; G11B 5/78

[58] Field of Search .......... 179/100.2 S, 100.2 MD, 179/100.1 VC; 360/55, 74, 134

[56] References Cited

UNITED STATES PATENTS

| | | | |
|---|---|---|---|
| 2,709,204 | 5/1955 | Holmes | 179/100.2 S |
| 3,409,239 | 11/1968 | Siebert | 179/100.2 S |
| 3,487,175 | 12/1969 | Newell | 179/100.2 S |

*Primary Examiner*—Bernard Konick
*Assistant Examiner*—R. S. Tupper
*Attorney, Agent, or Firm*—Flehr, Hohbach, Test, Albritton & Herbert

[57] ABSTRACT

A system and method for handling elongated pliable recording tape where the tape carries an anti-phase control signal which preconditions the playback apparatus in which reversal of the tape will occur in response to a subsequent predetermined drop in signal level of the reproduced program being played back.

6 Claims, 4 Drawing Figures

INVENTORS
JAMES W.F. BLACKIE
GREGORY J. MALESKI
CHESTER W. NEWELL
CHARLES A. VOGEL

BY

Flehr, Hohbach, Test, Albritton & Herbert
ATTORNEYS

TAPE ELEMENT, SYSTEM AND METHOD FOR REVERSAL OF TAPE MOVEMENT DURING LOW SOUND LEVELS

CROSS REFERENCE TO RELATED APPLICATIONS

This is a continuation of Ser. No. 42,278, filed June 1, 1970, now abandoned, which was a continuation in part of Ser. No. 648,665, filed June 26, 1967, now U.S. Pat. No. 3,573,393.

BACKGROUND OF THE INVENTION

This invention pertains to a control system and method for handling elongated pliable recording tape of a type, for example, as used in magnetic tape recorders, and to a control element in the form of a length of tape for operating such system.

Heretofore as in the tape recording apparatus shown in U.S. Pat. No. 3,370,803 and U.S. Pat. No. 3,487,175, both assigned to the Assignee herein, there is provided a magnetic tape recorder apparatus employing a drive capstan which is driven by a motor. An elongated pliable magnetic recording tape is wrapped to form supply and take-up rolls disposed in "rim" driven relationship to the rotating peripheral capstan surface, the planes of the rolls and the capstan all lying substantially in a single plane.

SUMMARY OF THE INVENTION AND OBJECTS

According to the present invention, it is a general object to provide a control system for feeding a magnetic recording tape in one direction while a recorded channel along the tape is transduced to reproduce a program recorded along that channel.

Near the end of the tape in the above apparatus, the tape is reversed and another channel is transduced so as to continue, essentially uninterrupted, the playing of the recorded program.

Thus, it is an object of the present invention to provide an improved data handling control system and method for reversing the tape drive and at substantially the same time switching the transducer means to cooperate with another track on the recorded tape.

In the present invention, the magnetic recording tape itself serves as a control element for operating the system and, accordingly, it is another object of the invention to provide an improved control element whereby reversal of the tape movement will be controlled and limited to those occasions when the signal level of the program being played is relatively low so as to make it that much easier to reverse the tape without the listener (or viewer) noticing the reversal. (Tapes of the present type are suitable also for video tape recording.)

While it conceivably might be possible to apply a suitable tone control to the tape element for reversing the travel of the tape at an appropriate position in advance of a particular low volume portion of the program recorded on the tape, it is believed that such a procedure ordinarily could be expected to be relatively difficult and create problems in the recording phase of the preparation of the tape element.

According to the present invention, however, the preparation of the machine control element in the form of the magnetic tape is readily easily accomplished by elimination of any critical procedures such as referred to above.

It is a further object of the invention to provide a machine control element in the form of an elongated magnetic recording tape wherein control signals are recorded thereon intermixed with the program signals recorded on the tape.

Yet another object of the invention is to provide a tape handling control system of a type whereby improper feeding of a tape or loading of a tape into the tape transport mechanism can be detected in a manner serving to initiate remedial measures.

These and other objects of the invention will become more readily apparent from the following detailed description of a preferred embodiment when considered in conjunction with the accompanying drawing.

DESCRIPTION OF THE PREFERRED EMBODIMENT

Figures 1, 2, 3, 4:
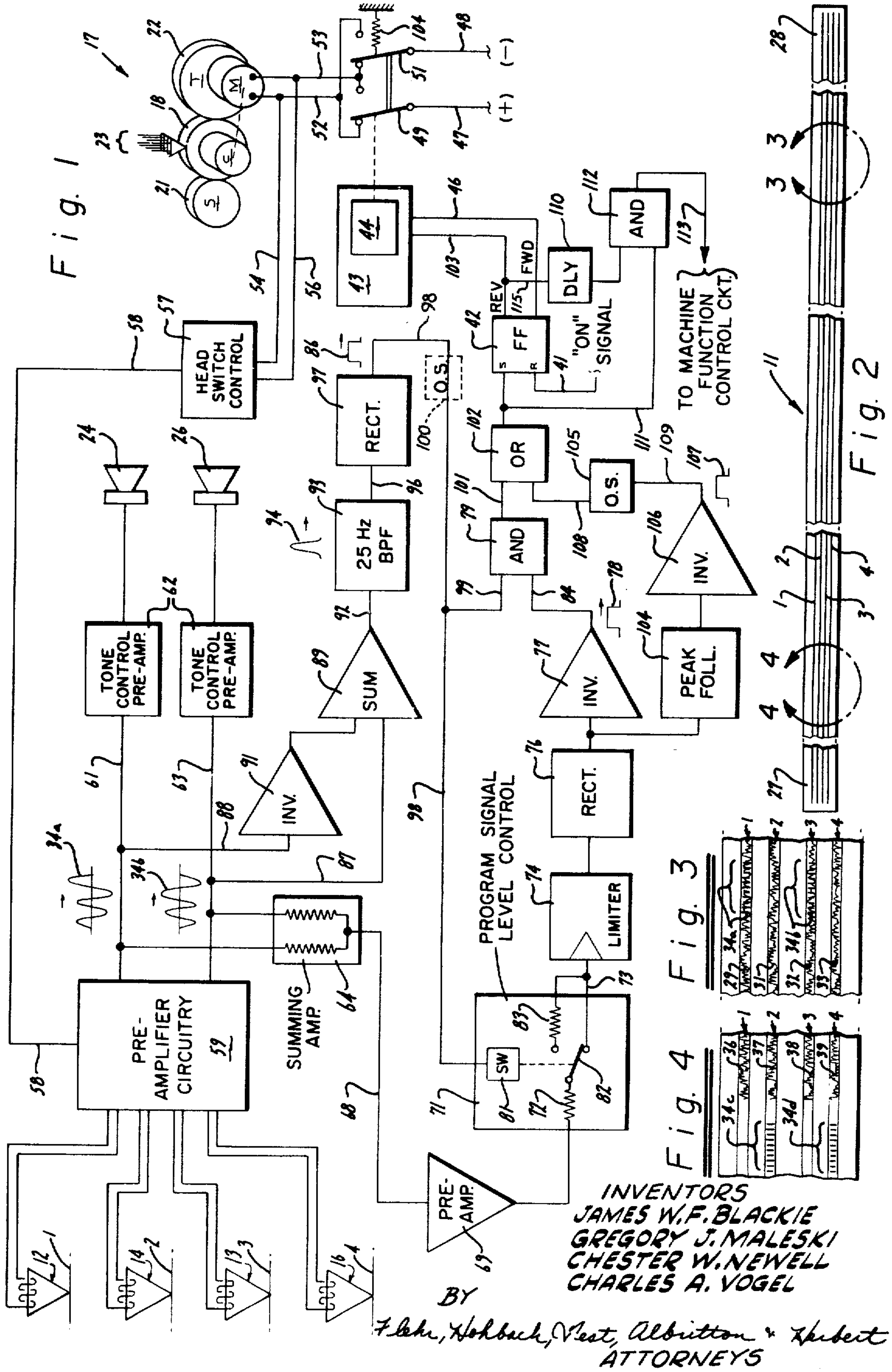
FIG. 1 shows a schematic diagram of the system which serves to control a magnetic recording apparatus schematically depicted therein.
FIG. 2 schematically represents an elongated tape machine control element.
FIG. 3 and FIG. 4 are diagrammatic enlarged detail views for the zones 3—3 and 4—4 shown in FIG. 2.

In magnetic recording technology, it is known to employ a magnetic recording transducer to record manifestations of electrical signals supplied to a magnetic recording transducer. These recorded manifestations of information signals may be representative of a program, such as selections of music or the like or other material, and may then be sensed or played back by moving the tape past a playback transducer.

In general, as disclosed herein, there is provided a tape handling control system and method of a type for use in a tape transport apparatus for feeding a pliable length of recorded tape in opposite directions between supply and take-up rolls. The motive means of the tape transport apparatus is controlled by the magnetic tape itself which acts as a part of the control system. Thus, there is provided a first means which monitors the recorded manifestations (of program information signals) disposed along a channel of the tape. A second means which is operatively coupled to the first named means senses a predetermined previously recorded control signal along the channel being monitored so as to provide a first command signal in the system. There is, further, a third means which afterwards senses the signal level of the program information signals along the channel to provide a second command signal upon detecting a reduction in the program signal level to a predetermined level as the monitoring means continues to sense the information signals. Means operatively coupled to receive each of the above command signals and further operatively responsive to the conjoint receipt thereof serves to operate the motive means in order to reverse the direction of movement of the tape as well as to condition the channel monitoring means to cooperate with and monitor another channel of the tape when the tape moves in a reverse direction.

With the foregoing system and method in mind, it will be readily apparent that the machine control element in the form of the elongated pliable magnetic recording tape is prepared with first and second channels extending along the tape. The first of the channels is prepared with a recorded manifestations of electrical signals representative of a first portion of a program recorded along the tape. These manifestations are adapted to be transduced by moving the tape in a first direction. A second channel is prepared along the tape with recorded manifestations of electrical signals representative of a second portion of the same program and these latter manifestations are adapted to be transduced by moving the tape in a second direction opposite to the first direction.

In a particularly preferred tape, each of the channels will include a pair of recording tracks, each adapted to be transduced, simultaneously as in providing stereophonic reproduction of a program.

Further, the machine control element in general includes a control signal applied to the tape wherein the control signal comprises a first portion of a substantially predetermined frequency recorded in one channel and a second portion of substantially the same predetermined frequency recorded in another channel of the tape. The phase of the two portions is arranged to be 180 electrical degrees mutually out of phase, and the two portions are recorded and disposed so as to be adapted to be transduced simultaneously whereby the sum of the two signals will essentially provide a cancellation.

Having the foregoing general arrangement in mind and referring to the drawings, FIG. 2 shows an elongated magnetic recording tape schematically represented to contain four recording tracks 1, 2, 3, 4 extending therealong. Manifestations of electrical signals representative of information to be recorded, such as music or the like, are applied to the tape 11 along these tracks.

Where magnetic tape element 11 is to be employed in recording stereophonic material or information, tracks 1 and 3 will be deemed to constitute a first channel of information and adapted to be sensed by moving the tape in one longitudinal direction relative to stationary magnetic transducers 12, 13. Transducers 14 and 16 are disposed in position and adapted to sense tracks 2 and 4 when tape element 11 is moved in an opposite direction.

It is to be appreciated that a magnetic recording tape transport apparatus of a type, as for example, referred to in the above referenced U.S. Pat. No. 3,370,803 is schematically indicated by the tape transport construction 17 comprised of a capstan 18 driven by a motor 19 in either of two opposite directions. Supply and take-up rolls 21, 22 of tape serve, when capstan 18 is rotated, to transport tape from the supply to the take-up roll past the four transducers 12, 13, 14 and 16 represented merely as an assembly by the numeral 23 which refers, for example, to a common structure containing each of the four transducer elements.

Where stereophonic music, for example, is to be reproduced from the magnetic recording tape element 11, it is conventional to transduce signals from one track of a dual track channel and feed these signals to a speaker associated with that particular track. Thus, track 1 is associated with speaker 24 while another speaker 26 is directly associated with the signals being transduced from the other track 3 of the channel.

The system shown in FIG. 1 is controlled by magnetic tape element 11. The following convention shall be employed in order to clarify terminology. Thus, if it is considered that the end 27 of tape element 11 represents the leading end of the tape as a roll is unwound onto transport apparatus 17 from supply roll 21, and end 28 represents that portion of the tape forming the innermost convolution of the tape on supply roll 21, then ends 27 and 28 will respectively be referred to as the "leading" and "terminal" ends of the tape.

As shown in FIG. 2, zone 3 is preferably located "near" the terminal end 28 of tape element 11 in the sense that as the last few convolutions are reached, zone 3 will appear. The tape in zone 3 is prepared with recorded manifestations of electrical signals 29 and 32 constituting part of a first portion of a program. A second portion of the same program (for stereo reproduction) is represented by the electrical signals 31, 33 recorded along tracks 2 and 4 in a manner adapted to be transduced and reproduced by means of movement of the tape in a reverse direction, as by reversing motor 19 to constitute supply roll 21 the take-up roll of the tape transport arrangement 17.

Element 11 is further provided with a control signal preferably in the form, for example, of manifestations which, when transduced, reproduce as a 25 Hertz signal. The manifestations constituting a control signal 34 are schematically indicated by the reference numerals *34a* and ***34b*.**

Thus, the control signal 34 comprises a first portion *34a* of substantially predetermined frequency recorded in one track of that channel comprised of tracks 1 and 3 and a second portion *34b* of substantially the same predetermined frequency recorded in the other track of the same channel, i.e. track 1 or 3. The two portions *34a* and *34b* are recorded in a manner whereby they are 180 electrical degrees out of phase with each other, and by being disposed laterally of each other, they are adapted to be transduced essentially simultaneously.

It is intended that upon sensing the control signal 34, the system as shown in FIG. 1 will respond in a manner whereby upon the occurrence of the next lull or low level in the program signals being reproduced the tape transport will be reversed so as to reverse the movement of the tape. At that time, transducer switching occurs so as to cause the transducers 14, 16 to cooperate with their respective tracks 2 and 4 as tape element 11 is reversed.

The other end of a machine control element 11 in the zone 4—4 has been prepared in a manner similar to that shown in FIG. 3 but with the exception that control signals *34c* and *34d* are recorded in a portion of their respective tracks 2 and 4 disposed to be transduced after the last of program signals 36, 37, 38, 39 have been played.

Having in mind the foregoing, and assuming that the machine control tape element 11 has been wrapped to form a supply roll 21 of transport apparatus 17 and has been threaded past transducer assembly 23 onto a hub forming take-up roll 22, operation of a power switch serves to generate an "on" signal by conventional means (not shown). This "on" signal appears on line 41 and serves to reset a flip-flop circuit 42 of conventional construction of the type whereby one of two stable states may be established. When flip-flop 42 has been "reset" by the electrical condition on line 41, the "reset" output of flip-flop 42 on line 46 serves to operate a switch control circuit 43 of suitable known construction whereby, for example, a solenoid 44, for example, will be energized by the signal on line 46.

By operating solenoid 44, the two power leads 47, 48 will be connected to motor 19 by means of the switch armatures 49, 51. Armatures 49, 51 move together and at that time will make connection with lines 52, 53 to operate motor 19 in a forward direction. At that point, the electrical state appearing on lines 52, 53 is utilized by means of leads 54, 56 to operate suitable known head switching control circuitry 57 so as to cause the necessary output on line 58 to gate or "switch on" transducers 12 and 13 to cooperate with tracks 1 and 3. Thus, transducers 12 and 13 feed these signals via the pre-amplifier circuitry 59 comprised of conventional known devices and thence to the two leads 61, 63 respectively to operate speakers 24, 26 via tone control pre-amplifier circuits 62. In this manner, conventional stereophonic reproduction of a program is obtained from tracks 1 and 3.

Means for sensing the program signal level along the two tracks 1 and 3 (as monitored by heads 12. 13) is comprised as now to be described.

A summing amplifier 64 connected by lines 66, 67 serves to sum the output of signals monitored by heads 12, 13 along tracks 1 and 3.

Thus, the summed output on line 68 represents the signal level for the prerecorded program signals along tracks 1 and 3. This summed output on line 68 is fed via a pre-amplifier circuit 69 through a program signal level control circuit 71.

Circuit 71 serves to determine which of two signal levels will be employed in generating a command signal later described herein. Thus, in its normal condition, as shown in FIG. 1, signals representative of the signal level as sensed by summing circuitry 64 and appearing on line 68 are normally fed via a first input leg represented by the signal resistance 72 and onward to line 73 coupled to the limiter 74. Limiter 74 is characterized by relatively high gain and sends its output to a rectifier 76.

In this manner, the program signal level is manifested at the output of rectifier 76 as a DC voltage. If this voltage level is relatively low, it means that the signal level is also relatively low on tracks 1 and 3. Accordingly, an inverter 77 is employed to invert the relatively low DC voltage level to a commensurately relatively high voltage level constituting one of two command signals, i.e. signal 78 leading into AND gate 79.

Referring for the moment to the program signal level control circuit 71, a suitable switch means 91 operates a switch armature 82 whereby the impedence into limiter 74 can be increased by merely introducing an additional resistance element 83. This action has the effect of causing the circuit of limiter 74, rectifier 76, inverter 77 to generate a command signal 78 when the signal level from summing circuit 64 falls only a portion of the amount normally required to create command signal 78.

In short, means have been provided utilizing switch means 81 whereby although normally a "silence" condition would be necessary to be represented on lines 68 before command signal 78 can be generated by merely shifting armature 82, a −20 v.u. drop will be enough.

It has been found desirable to effect reversal of the tape drive during periods when the program signals are not as low as in a "silence" condition. Thus, in the recording of music or other material on tape as well as speech programs, for example, it is customary to record the program at a predetermined operating level customarily in the range of zero v.u. These units refer to "volume unit" as is known in the recording technology. The input via line 84 to AND gate 79 can thus be derived from either the first predetermined level sensed whereby the volume level of the program drops to a figure, for example, on the order of −20 v.u. On the other hand, circuitry 71 is normally conditioned whereby a "silence" level must be sensed in order to generate a command signal on line 84.

Means have been provided whereby a predetermined control signal 34 serves to shift armature 82 to permit the −20 v.u. drop in signal level to provide a command signal 78 for AND gate 79.

Accordingly, as the portions 34*a*, 34*b* of control signal 34 appear on lines 61, 63 by virtue of having been sensed by transducers 12 and 13, they will be transmitted to their respective speakers 24, 26. It is to be understood, however, that the amplitude of portions 34*a* and 34*b* is relatively low so that any modulation effect which it might otherwise have on the program signals on lines 61, 63 will be minimal and substantially unnoticed.

It is further to be appreciated that any modulation effect which these two portions may have will be unnoticed by a person listening to the two speakers 24, 26 at any substantial distance inasmuch as the phase of the two signal portions 34*a*, 34*b* serves to provide mutual cancellation of their effect.

Means for providing a command signal 86 to provide a second input for AND gate 79 includes the two lines 87, 88 coupled to lines 61, 63. Signal portion 34*b*, as well as all other signals transduced from track 3, will be fed via line 87 to a summing amplifier circuit 89. At the same time, signals on line 61, including signal portion 34*a* of control signal 34, will be sensed via line 88 and fed into an inverter circuit 91. From circuit 89, the sum of the monitored signals travels via line 92 to means serving to isolate the 25 Hertz control signal 34 from the program signals.

Thus, a band pass filter 93, having a characteristic serving to pass only a very narrow band of frequencies on the order of 25 Hertz provides an output pulse 94 on line 96 to be rectified by circuit 97 and provide a relatively high voltage level for command signal 86.

Accordingly, it will be readily apparent that inverter 91 serves to place signal portions 34*a* and 34*b* in phase with each other and by summing them in circuitry 89, the output will be relatively high. Then by isolating the particular band of frequencies in the range of the frequency of control signal 34, the rectified output provided by circuit 97 provides the relatively high level for command signal 86 which is adapted to be fed into AND gate 79 and form the other input thereto. Signal 86 is also fed via line 98 to operate switch means 31 in establishing the program signal level which is to be sensed. Upon the conjoint receipt of command signals 78 and 86 at the inputs of AND gate 79 (via line 84 and line 99) an output signal will appear on lead 101.

The output on lead 101 is fed via the OR gate 102 to "set" flip-flop 42 thereby reversing the output state of flip-flop 42 and causing a reversal of the electrical condition on lines 46 and 103. In this manner, the output from flip-flop 42 on line 103 serves to reverse the operation of control circuit 43 whereby solenoid 44 shall be de-energized so that spring 104 moves switch armatures 49, 51 to reverse the electrical connections to leads 52, 53.

By reversing the connections on leads 52, 53, the transducer gating control circuit 57 reacts and gates transducers 14, 16 into operation and decouples transducers 12, 13 from sensing lines 61, 63.

At the same time, however, motor 19 now operates in a reverse direction by virtue of having a reversal of the current applied thereto. Thus, the reversal of the drive of capstan 18 occurs at that point in the program when the signal level falls to −20 v.u., but only when such lull in the program has been accompanied by establishment of command signal 86. Accordingly, control signals 34 are recorded along a sufficient length of their respective tracks to provide a period sufficient to insure that a lull in the program will be sensed conjointly therewith.

To avoid prolonged recordation of signal 34 along tracks 1 and 3, it is readily apparent that a device such as a one-shot multivibrator 100 having a predetermined period corresponding to the duration of the signal 34 as would otherwise be recorded could be interposed in line 98 to respond to a short duration pulse 34 and thereby apply a prolonged command signal to AND gate 79 and in this manner provide a prolonged command signal without a similarly prolonged recordation on tracks 1 and 3.

Means are further provided herein whereby in the event that a tape is improperly threaded onto capstan 18 in a manner whereby no signals whatever are transduced by heads 12, 13 (or 14 and 16) for an extended period of time, for example, on the order of seven seconds so that it could indicate that perhaps the tape has not been properly threaded, means are provided which serve to reverse the tape drive should it be operating in the forward direction. Likewise, means are provided to generate a control signal for effecting any other machine function control which is deemed necessary or desirable in the particular apparatus to be employed, whenever the predetermined silence period occurs at the end of the program in the reverse direction. For example, it may be desired to lower or draw one of several tape rolls away from the capstan, or to turn motor 19 off completely rather than to reverse the motor, or otherwise vary the operation of the equipment.

Thus, it will be recalled that switch armature 82 normally is in the position shown in FIG. 1, whereby a "silence" is sensed on line 73 and fed through limiter 74 to rectifier 76, a peak follower circuit 104 provides a decrease in output signal after a predetermined expiration of time so that inverter circuit 106 will generate a relatively high level command signal 107 on line 109 into a one-shot multivibrator 105 which provides a very short pulse on line 108.

Line 108 is fed to OR gate 102 whereby a signal 107 by itself serves to "set" flip-flop 42 and effect reversal of the drive on motor 19. The output state on flip-flop 42 is also fed via a delay circuit 110 to AND gate 112 whereby only when the reverse state has existed for some while will AND gate 112 function. Otherwise the inputs via lines 111 and 115 might coincide at the moment that reversal is being initiated.

From the foregoing, it will be readily apparent that an improved tape handling control system and method are provided whereby an elongated pliable magnetic recording tape can be fed in one direction and then reversed at a point in time when the program being presented is best suited to accommodate such reversal. In this manner, such reversal can be effected with little noticeable interruption in the program itself.

Reversal can, for example, be readily accomplished within a time period on the order of 300 milliseconds or less if desired.

It will be further readily apparent that at the outset of feeding tape from the supply to the take-up rolls 21, 22, respectively, after a period sufficient to give transport 17 adequate time to have become properly threaded as in a self-threading type of transport (see U.S. Pat. No. 3,370,803) the further existence of silence in the circuitry will cause command signal 107 to reverse the drive of capstan 18 and thereby unthread the tape to the extent that it may have been threaded and to otherwise operate the machine. For example, the machine embodying transport 17 may also be operated as by drawing one of the rolls away from the capstan, or de-energizing motor 19, or otherwise. Furthermore, the capability of generating a command pulse 107, which can independently act in the event that "silence" exists for a prolonged period, serves to act as a secondary control device in the event of failure of the control signal 34 to effect reversal, for example, in the event that inadvertently control signal 34 were to be recorded at a point along tape element 11 beyond the last "lull" in the recorded program.

In view of the fact that the summing amplifier 64 serves to sense the existence of signals on both tracks 1 and 3 or 2 and 4, (depending upon the direction of movement of the tape) and that this sensing of the tracks is accomplished simultaneously, it is apparent that no 25 Hertz tone will be sensed by circuitry 64 due to the anti-phase relationship of portions **34*a*, 34*b* and, therefore, circuitry 64 will not be "confused" by the 25 Hertz tone to a point causing malfunction. Accordingly, "silence" can be sensed at the very time when a control signal 34 actually exists for further controlling operation of tape transport apparatus 17**.

After transport 17 has been conditioned to play in a reverse direction by means of the action of the conjoint sensing of control signal 107 to "set" flip-flop 42, tape element 11 continues to advance in a reverse direction until the program signal manifestations 37, 39 on tracks 2 and 4, respectively, have been completely played. Shortly thereafter, control signal portions **34*c* and 34*d* (applied to tracks 2 and 4 at a point on the tape immediately just beyond the end of the program signals) will generate another command signal 86** in the manner above described.

The coincidence of command signal 78 with command 86 at AND gate 79 serves to apply a signal to the "set" input of flip-flop 42 tending to reverse operation of motor 19 if it were not already in the reverse mode. However, in view of the fact that motor 19 is then already in the reverse mode of operation, this signal input to flip-flop 42 is ineffectual to further reverse the motor. On the other hand, the output of OR gate 102 responsive to the conjoint receipt of signals 86, 78 by AND gate 79 is also sensed via line 111.

The output state of flip-flop 42 in the reverse mode is fed to AND gate 112 via lead 103. Thus, there will be signals conjointly representative of the reverse operation of motor 19 and the existence of control signals **34*c*, 34*d*, at AND gate 112 to provide an output of line 113**, which sends an appropriate signal to control a suitable machine function circuit as desired.

For example, one such circuit may be one which would de-energize motor 19 or serve to withdraw one of the rolls from the capstan 18. Other machine functions, of course, can be imagined which could be produced at a time when the system has been notified that the tape has been returned to its original starting position.

As a secondary measure, a command signal 107 is, of course, generated by the existence of the "silence" on tracks 2 and 4 at a time some time after the recorded program signals have terminated. Thus, a command signal 107 is generated on line 108 and fed via OR gate 102 and line 111 to AND gate 112 in conjunction with a reverse command present on line 103 whereby it may serve on line 113 to control a machine function circuit as desired after operation in the reverse direction is completed.

By virtue of the fact that "silence" is being sensed by the transducers 14 and 16 operating in the reverse direction, after a predetermined period of time on the order of, for example, seven seconds, a command signal on line 113 will be generated and this signal is fed to any other machine function control circuit as may exist in the apparatus, for example, to shut down the operation of motor 19 or to disengage certain drive mechanism or the like.

So far, the method of the present invention has been described only in connection with a presently preferred embodiment of apparatus capable of carrying it out. Briefly, this method can be summarized as comprising the following steps: passing a pliable length of recording tape in a first direction of travel between supply and take-up rolls, transducing a portion of program information along a first channel of the tape while the tape is passing in the first direction, transducing a discrete control signal on the tape at a predetermined limited point along its length while the tape is passing in the first direction, reversing the direction of travel of the tape when the level of the program information in the first channel drops below a predetermined level after the control signal is transduced, and transducing a second portion of program information along a second channel while the tape is passing in a second direction of travel between the supply and take-up rolls.

From the foregoing, it is apparent that a new and improved system and method have been provided for reversing the direction of tape travel and at substantially the same time switching transducer means between two channels to provide substantially uninterrupted transducing of a program in the two channels.

We claim:

1. As an article of manufacture a length of pliable recording tape having a first elongated record channel, recorded manifestations of electrical signals in said first channel representative of a first portion of a reproducible program and adapted to be transduced in a first direction of movement of the tape, a second elongated record channel, recorded manifestations of electrical signals in said second channel representative of a second portion of the same said reproducible program adapted to be transduced in a second direction of movement of the tape opposite said first direction, the manifestations representing the end of said first portion being disposed at substantially the same position along the length of said tape as the manifestations representing the beginning of said second portion, and recorded means carried by the tape for providing a control signal at a predetermined limited point prior to the end of the first portion of said program, said recorded means for providing said control signal comprising first and second portions of recorded manifestations representative of a substantially predetermined frequency, the control signal portions being substantially 180 electrical degrees out of phase and disposed and adapted to be transduced simultaneously, the recorded manifestations of said first portion of said program including, at a point along said first channel disposed to be transduced subsequent to said control signal, recorded manifestations of electrical signals representative of the program and falling below a predetermined level to define the end of said first program portion.

2. An article as in claim 1 wherein each of said channels comprises a pair of recording tracks, each carrying a portion of the recorded program manifestations, the two portions of said control signal being recorded in the tracks of said first channel.

3. A combination program tape and control element for a tape transport system of a type in which the direction of tape movement is reversed rapidly in response to a predetermined condition in the recorded manifestations representing a program recorded on the tape to provide a substantially imperceptible transition between first and second portions of the program notwithstanding reversal of the tape between said portions, said program tape and control element comprising a length of pliable recording tape, a first elongated record channel extending along said tape, recorded manifestations of electrical signals in said first channel, said signals being representative of a first portion of a reproducible program adapted to be transduced in a first direction of movement of the tape, a second elongated record channel extending along said tape, recorded manifestations of electrical signals in said second channel representative of a second portion of said reproducible program adapted to be transduced in a second direction of movement of the tape opposite said first direction, the manifestations representing the end of said first program portion being disposed at substantially the same position along the length of said tape as the manifestations representing the beginning of said second program portion, the level of the electrical signals represented by the recorded manifestations at the end of said first program portion being below a predetermined level and defining the end of said first program portion, and control signal means carried by the tape at a predetermined limited point disposed in advance of the last named recorded manifestations for preconditioning the tape transport system for later reversing the direction of tape movement in response to sensing those said manifestations of said signals below said predetermined level.

4. A program tape and control element according to claim 3 wherein the means for preconditioning the transport system comprises first and second portions of recorded manifestations representative of a substantially predetermined frequency, the last named portions being substantially 180 electrical degrees out of phase with each other and disposed in such manner that they can be sensed simultaneously.

5. In a method for recording a reproducible program on a tape, the steps of recording a first portion of the program in a first channel on the tape, said first portion being adapted to be transcribed for reproduction as the tape is moved in a first direction of travel, recording a second portion of the program in a second channel on the tape, said second portion being adapted to be transcribed for reproduction as the tape is moved in a second direction of travel, the beginning of said second portion being disposed to be transcribed sufficiently immediately after the end of said first portion to provide to the human senses substantially uninterrupted continuity to said program between said first and second portions thereof as the direction of tape movement is reversed from said first direction to said second direction, and disposing a control signal on the tape in a position to be transcribed prior to the end of the first portion of the program as the tape is moved in the first direction of travel, recording said first and second portions in such manner that the level of the program at the end of the first portion and at the beginning of the second portion lies sufficiently below a predetermined level such that the program can continue to be reproduced without noticeable interruption of said program to the human senses notwithstanding occurrence of said reversal of tape movement between said first and second portions, the control signal being recorded in two portions which are 180 electrical degrees out of phase with each other and adapted to be transcribed simultaneously.

6. The method defined by claim 5 wherein said first channel has two tracks and the two portions of the control signal are recorded in said tracks.

* * * * *